United States Patent [19]

Herman et al.

[11] Patent Number: 5,693,391

[45] Date of Patent: Dec. 2, 1997

[54] PLASTIC CONTAINER MADE FROM A FUSION BLEND OF POST CONSUMER PLASTIC AND ETHYLENE POLYMERS

[75] Inventors: James N. Herman, Sylvania; James M. Fargher, Holland, both of Ohio

[73] Assignee: Owens-Illinois Plastic Products Inc., Toledo, Ohio

[21] Appl. No.: 779,537

[22] Filed: Jan. 8, 1997

Related U.S. Application Data

[63] Continuation of Ser. No. 219,810, Mar. 29, 1994, which is a continuation of Ser. No. 842,839, Feb. 27, 1992, abandoned.

[51] Int. Cl.⁶ .................................................. C08L 23/06
[52] U.S. Cl. ........................ 428/35.7; 264/500; 264/512; 525/240
[58] Field of Search .................. 264/500, 512; 428/35.7; 525/240

[56] References Cited

U.S. PATENT DOCUMENTS

| | | | |
|---|---|---|---|
| 3,261,889 | 7/1966 | Van Wout | 260/897 |
| 3,280,220 | 10/1966 | Nelson | 260/897 |
| 3,795,633 | 3/1974 | Golovoy | 260/2.3 |
| 3,884,855 | 5/1975 | Baumann et al. | 260/2.3 |
| 3,976,612 | 8/1976 | Kaji et al. | 260/23 R |
| 4,115,499 | 9/1978 | Salyer et al. | 264/122 |
| 4,332,748 | 6/1982 | Fremont | 264/11 |
| 4,390,666 | 6/1983 | Moriguchi et al. | 525/194 |
| 4,495,334 | 1/1985 | Matsuyra et al. | 525/240 |
| 4,547,551 | 10/1985 | Bailey et al. | 525/240 |
| 4,550,143 | 10/1985 | Tanaka et al. | 525/240 |
| 4,556,768 | 12/1985 | Go et al. | 525/240 |
| 4,567,069 | 1/1986 | Jabarin | 428/35 |
| 4,737,547 | 4/1988 | White | 525/193 |
| 4,786,688 | 11/1988 | Thiersault et al. | 525/240 |
| 5,028,663 | 7/1991 | Chung | 525/198 |
| 5,030,662 | 7/1991 | Banerjie | 521/43.5 |
| 5,073,416 | 12/1991 | Avakian et al. | 428/2 |
| 5,073,598 | 12/1991 | Anzini | 525/193 |
| 5,210,142 | 5/1993 | Kale et al. | 525/240 |

FOREIGN PATENT DOCUMENTS 9119763  12/1991  WIPO.

*Primary Examiner*—Charles Nold

[57] ABSTRACT

A plastic container made from a fusion blend of a post consumer resin and a high density polyethylene copolymer resin. The post consumer resin is primarily a high density homopolymer and may contain small amounts of colored plastic containers and propylene resin. The physical properties of the container including stress crack resistance are maintained as contrasted to the loss of such physical properties that have been heretofore resulted from the use of post consumer resins.

2 Claims, No Drawings

PLASTIC CONTAINER MADE FROM A FUSION BLEND OF POST CONSUMER PLASTIC AND ETHYLENE POLYMERS

This is a continuation of Ser. No. 08/219,810 filed on Mar. 29, 1994, which was a continuation of application Ser. No. 07/842,839, filed Feb. 29, 1992, abandoned.

BACKGROUND AND SUMMARY OF THE INVENTION

In the use of plastic materials for containers such as bottles, it has been found desirable to attempt to recycle and reuse the plastic which is commonly known as post consumer plastic (PCP) or post consumer resin (PCR). In attempts to make containers from such materials, it has been found that the properties have been adversely affected.

Specifically when containers are made from post consumer high density polyethylene homopolymers (HDPE) container scrap, it has been found that the containers have diminished physical properties and particularly diminished resistance to stress cracking. Such containers made of high density polyethylene homopolymers also have been used for packaging of certain types of liquid detergent products. The use of such containers to package liquid detergent products has been somewhat restricted, however, by reason of the fact that many types of liquid detergent products accelerate the tendency of the container to exhibit stress cracking. Stress cracking is evidenced by the appearance of hazy cracks in the container which are aesthetically unpleasing to the ultimate consumer. In extreme cases, stress cracking can lead to leakage of the contents from the container. Stress cracking can occur when the containers are for liquid products including liquid detergents and liquid hypochlorite bleaches.

It has been suggested that such post consumer resin be utilized because large quantities of high density polyethylene post consumer resin are available due to the extensive use of high density polyethylene in large containers for milk and water. Post consumer resin from such containers contains contaminants of paper and other plastic resins, for example, from closures such that it has been generally thought that it can not be used to make satisfactory plastic containers.

Accordingly among objectives of the present invention are to provide a blend of post consumer resin from high density polyethylene containers and the like which will have substantial resistance to stress cracking and which will have minimal diminution in other physical properties permitting its use for various kinds of containers, that is for containing various products.

DESCRIPTION OF THE PREFERRED EMBODIMENT

In accordance with the invention, a plastic container made from a fusion blend of a post consumer resign and a high density polyethylene copolymer resin. The post consumer resin is primarily a high density homopolymer and may contain small amounts of colored plastic containers and propylene resin. The physical properties of the container including stress crack resistance are maintained as contrasted to the loss of such physical properties that have been heretofore resulted from the use of post consumer resins.

In accordance with the invention, pellets of a homopolymer high density polyethylene resin from post consumer resin (PCR) and pellets of a virgin high density polyethylene copolymer were mixed and fusion blended. Containers were blow molded and subjected to testing for stress cracking, top load and drop impact.

The blends of the present invention contain about 15–50% by weight of post consumer resin and about 50–85% by weight of virgin high density polyethylene copolymer resin.

Post consumer resin contains primarily the plastic from high density polyethylene homopolymer containers used for packaging milk and small amounts of colored plastic containers and possible polypropylene resin from syrup bottles, multi-layer ketchup bottles and caps. Such post consumer resin has the properties set forth in the following Table I.

TABLE I

| PROPERTY | SPECIFIED VALUE |
| --- | --- |
| Material Density | .961 ± .002 natural |
| Melt Flow - Melt Index | 0.75 ± 0.2 dgm |
| Polypropylene (Includes Multi-layer Bottles) | Not to exceed 3% |
| Fines | <0.01% |
| Moisture | <0.05% |
| Contamination | |
| Paper | <0.01% |
| Plastic-Dens. >1.0 gm/cc | <0.1% |
| Metal fragments | None |
| Other (glass, stone) | None |

The virgin high density copolymer resin contains linear high-density ethylene polymer. The linear high-density ethylene copolymer included in the blends will have a density of at least about 0.94 gm/ml, a melt index of less than about 0.5 gm/10 min. and will have polymerized therein at least about 98 mol % ethylene with any comonomer polymerized therein being an alpha-monoolefin containing about 3 to 12 carbon atoms. Such linear high-density ethylene polymers are known and reported in the art and are commercially available from numerous commercial producers. Such linear high-density ethylene polymers are prepared by polymerizing ethylene, optionally in the presence of an alpha-monoolefin comonomer containing 4 to 12 carbon atoms in the presence of certain metallic catalysts such as chromium catalysts, e.g. $CrO_3$ supported on silica-alumina supports, and the Ziegler-Natta catalysts, e.g. $TiCl_3$ employed in conjunction with certain aluminum alkyl cocatalysts. The requisite density and melt index desired in the polymer are obtained by proper control of polymerization conditions including temperature, pressure, comonomer concentration, and the concentration of telegenating agents such as hydrogen. The preferred linear high-density ethylene polymers will have a density of at least about 0.94 gm/ml. The especially preferred polymers will have a density of at least about 0.95 gm/ml. Stress crack resistance is conventionally conducted with test methods as established by Technical Bulletin PBI 11-1978 of the Plastic Bottle Institute, Rev.1-1991 or ASTM D2561-70 (Reapproved 1989).

The following Table II summarizes one set of tests that have been conducted.

32 OZ. PINCH WAIST OVAL

| RUN# | 1 | 2 | 3 | 4 | 5 | 6 | 7 |
| --- | --- | --- | --- | --- | --- | --- | --- |
| % PCR | | 25 | 40 | 50 | 60 | 75 | 100 |
| % Virgin Copolymer | 100 | 75 | 60 | 50 | 40 | 26 | |
| Gram Weights | 46.54 | 46.80 | 46.45 | 46.45 | 46.61 | 47.17 | 46.53 |
| (20 Bottles) Mean | .338 | .263 | .244 | .169 | .270 | .229 | .228 |

The following Table II summarizes one set of tests that have been conducted.

32 OZ. PINCH WAIST OVAL

| RUN# | 1 | 2 | 3 | 4 | 5 | 6 | 7 |
|---|---|---|---|---|---|---|---|
| STD. Dev. | | | | | | | |
| TOP Load (10 Bottles) Pounds | 37.2# | 41.8# | 43.2# | 43.7# | 47.9# | 44.4# | 45.8# |
| Drop Impact Test (25 Bottles) Bruceton Staircase EMFH | 7.36' | 8.44' | 8.96' | 8.18' | 7.40' | 9.25' | 8.13' |
| Stress Crack Test 140 Degrees (10 Bottles) Days to 1st Fail/50% Fail | 42/** | 4/27 | 3/8 | 8/12 | 1/2 | 1/1 | 1/1 |
| 120 Degrees (10 Bottles) Days to 1st Fail/50% Fail | 6/16 | 4/6 | 3/3 | 3/4 | 1/2 | 1/1 | 1/1 |

**Variable #1 Bottles had been in 140 Deg. Stress Crack for 51 Days as of 1/31/92, 50% Failure had yet to occur.

Additional tests are summarized in the following Table:

TABLE III

Data Summary 16 oz. Oval
Control Virgin Copolymer
15% Milk Bottle PCS Material
30% Milk Bottle PCS
45% Milk Bottle PCS Material

| | Averages | | | |
|---|---|---|---|---|
| | Control | 15% | 30% | 45% |
| gram weights (50 bottles) | | | | |
| mean | 34.83 | 34.77 | 34.95 | 35.22 |
| std. dev. | .1870 | .3058 | .1992 | .1918 |
| top load test (10 bottles) | | | | |
| pounds | 66.6 | 73.2 | 68.6 | 60 |
| drop impact test (25 bottles) | | | | |
| Bruceton Staircase stress crack test (140° F.) | 9.5+ | 9.25 | 9.5+ | 9.5+ |
| # of failures | 0 | 0 | 0 | 0 |

The post consumer resin in pellet form was dry mixed with virgin 0.954 density copolymer HDPE resin pellets and the blend was fed to the machine hopper. Melt temperature was approximately 400° F. No processing or machine changes were made in order to produce good quality bottles.

It can thus be seen that there has been provided a plastic container is made from a fusion blend of a post consumer resin and ethylene polymers comprising post consumer resin of homopolymer high density polyethylene plastic and virgin high density polyethylene copolymer resin. The physical properties of the container including stress crack resistance are maintained as contrasted to the loss of such physical properties that have been heretofore resulted from the use of post consumer resins.

We claim:

1. The method of making a plastic container comprising providing a fusion blend consisting essentially of a blend of:

pellets of post consumer resin of homopolymer high density polyethylene resin; and pellets of virgin high density polyethylene copolymer resin, said pellets of post consumer resin having a density of about 0.961±0.002 gm/ml and a melt index of 0.75±0.2 dgm and polypropylene blended with the post consumer resin not to exceed 3% by weight, said pellets of virgin high density polyethylene copolymer resin having a density of at least about 0.94 gm/ml and a melt index less than about 0.5 gm/10 min., said post consumer resin ranging between about 15% to 50% and said virgin high density copolymer resin ranging between about 50% to 85% by weight of the fusion blend, blow molding a plastic container from said fusion blend to provide a plastic container such that the plastic container has satisfactory stress crack resistance, top load and drop impact properties.

2. The method set forth in claim 1 wherein said post consumer resin comprises at least of the fusion blend.

* * * * *